United States Patent
Ponnuru et al.

(10) Patent No.: US 12,413,421 B2
(45) Date of Patent: Sep. 9, 2025

(54) TRUSTED AND VALIDATED PLATFORM DEVICE CERTIFICATE PROVISIONING USING SECURITY PROTOCOL DATA MODEL (SPDM)

(71) Applicant: Dell Products, L.P., Round Rock, TX (US)

(72) Inventors: Viswanath Ponnuru, Bangalore (IN); Chandrashekar Nelogal, Round Rock, TX (US); Dharma Bhushan Ramaiah, Bangalore (IN); Vineeth Radhakrishnan, Palakkad (IN); Mini Thottunkal Thankappan, Bangalore (IN); Rama Rao Bisa, Bangalore (IN); Shinose Abdul Rahiman, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 232 days.

(21) Appl. No.: 18/184,412

(22) Filed: Mar. 15, 2023

(65) Prior Publication Data
US 2024/0313983 A1    Sep. 19, 2024

(51) Int. Cl.
*H04L 9/32* (2006.01)

(52) U.S. Cl.
CPC .......... *H04L 9/3265* (2013.01); *H04L 9/3268* (2013.01)

(58) Field of Classification Search
CPC ............................ H04L 9/3265; H04L 9/3268
See application file for complete search history.

(56) References Cited

U.S. PATENT DOCUMENTS

| | | | |
|---|---|---|---|
| 2020/0382312 A1* | 12/2020 | Rao | H04L 9/0637 |
| 2021/0367974 A1* | 11/2021 | Ponnuru | H04L 63/0823 |
| 2022/0012187 A1* | 1/2022 | Contreras Munoz | G06F 21/44 |

OTHER PUBLICATIONS

DMTF "Security Protocol and Data Model (SPDM) Specification" Jun. 23, 2022 [retrieved on Dec. 16, 2024]. Retrieved from the internet: <URL: https://www.dmtf.org/sites/default/files/standards/documents/DSP0274_1.2.1.pdf> (Year: 2022).*

* cited by examiner

*Primary Examiner* — Hany S. Gadalla
(74) *Attorney, Agent, or Firm* — Fogarty LLP

(57) ABSTRACT

Systems and methods provide for SPDM-enabled devices that conform to an SPDM specification. An SPDM-enabled device receives a request to provision a certificate chain on the device and sends an event notification message to a baseboard management controller. The event notification message indicates receipt of a request to provision a certificate chain in a slot on the SPDM-enabled device. The baseboard management controller evaluates the certificate chain against the device manufacturer's certificate profile policy. If the certificate chain is valid, then a validation successful message is sent to the SPDM-enabled device, which in turn sends a certificate provision response to a requesting device. If the certificate chain is not valid, then a validation failure message is sent to the SPDM-enabled device, which causes the SPDM-enabled device to enter a quarantine state.

20 Claims, 3 Drawing Sheets

TRUSTED AND VALIDATED PLATFORM DEVICE CERTIFICATE PROVISIONING USING SECURITY PROTOCOL DATA MODEL (SPDM)

BACKGROUND

The Open Compute Project's (OCP) Datacenter-Modular Hardware System (DC-MHS) sub-project is directed to interoperability between elements of datacenter, edge, and enterprise infrastructure. DC-MHS provides consistent interfaces and form factors among modular building blocks. DC-MHS standardizes a collection of form-factors and supporting ingredients to allow interoperability between different platforms. The Security Protocol and Data Model (SPDM) specification defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

Datacenter, edge, and enterprise infrastructure may include various Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments are directed to validating and verifying platform device SPDM certificate profiles and protecting against malicious certificate provisioning from untrusted device sources.

In one embodiment, an SPDM-enabled device conforms to an SPDM specification. The SPDM-enabled device receives a request to provision a certificate chain on the device, sends an event notification message to a baseboard management controller, wherein the event notification message indicates receipt of a slot provisioning request, and receives a validation message from the baseboard management controller indicating either that the certificate chain is valid or not. The request to provision the certificate chain is an SPDM SET_CERTIFICATE request message. If the validation message indicates a successful validation, then the SDPM-enabled device provisions the certificate chain in a designated slot and sends a certificate chain provision response to a requesting device. The certificate chain provision response is an SPDM SET_CERTIFICATE_RSP response message. If the validation message indicates a validation failure, then the SPDM-enable device enters a quarantine state until a certificate chain is successfully validated by the baseboard management controller.

A BMC receives an event notification message from the SPDM-enabled device. The event notification message indicates receipt of a request to provision a certificate chain in a slot on the SPDM-enabled device. The BMC evaluates the certificate chain against a certificate profile policy and notifies the SPDM-enabled device whether the certificate chain is valid or not. If the certificate chain is valid based on the certificate profile policy, the BMC sends a validation successful message to the SPDM-enabled device. If the certificate chain is not valid based on the certificate profile policy, the BMC sends a validation failure message to the SPDM-enabled device. The BMC is configured to obtain the certificate profile policy from a manufacturer of the SPDM-enabled device.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Modular server architectures give cloud service providers a variety of compute choices to meet market and business conditions, offer flexible configurations, and deliver innovative solutions. The Datacenter-Modular Hardware System (DC-MHS) provides interoperability between datacenter, edge, and enterprise infrastructure using consistent interfaces and modular building blocks. DC-MHS standardizes various Host Processor Module (HPM) form factors and provides supporting elements for interoperability of HPMs across various platforms. The HPM is managed by a Datacenter-Secure Control Module (DC-SCM), which is designed to enable a common management and security infrastructure across platforms within a data center. The interface between the DC-SCM and the HPM is referred as the Datacenter-Secure Control Interface (DC-SCI).

The HPM is a traditional CPU-memory device with the Baseboard Management Controllers (BMC) and security functions moved to the DC-SCM. HPMs are not limited to a standard processor architecture and can apply any processor architecture utilizing management and security features.

Figure 1:
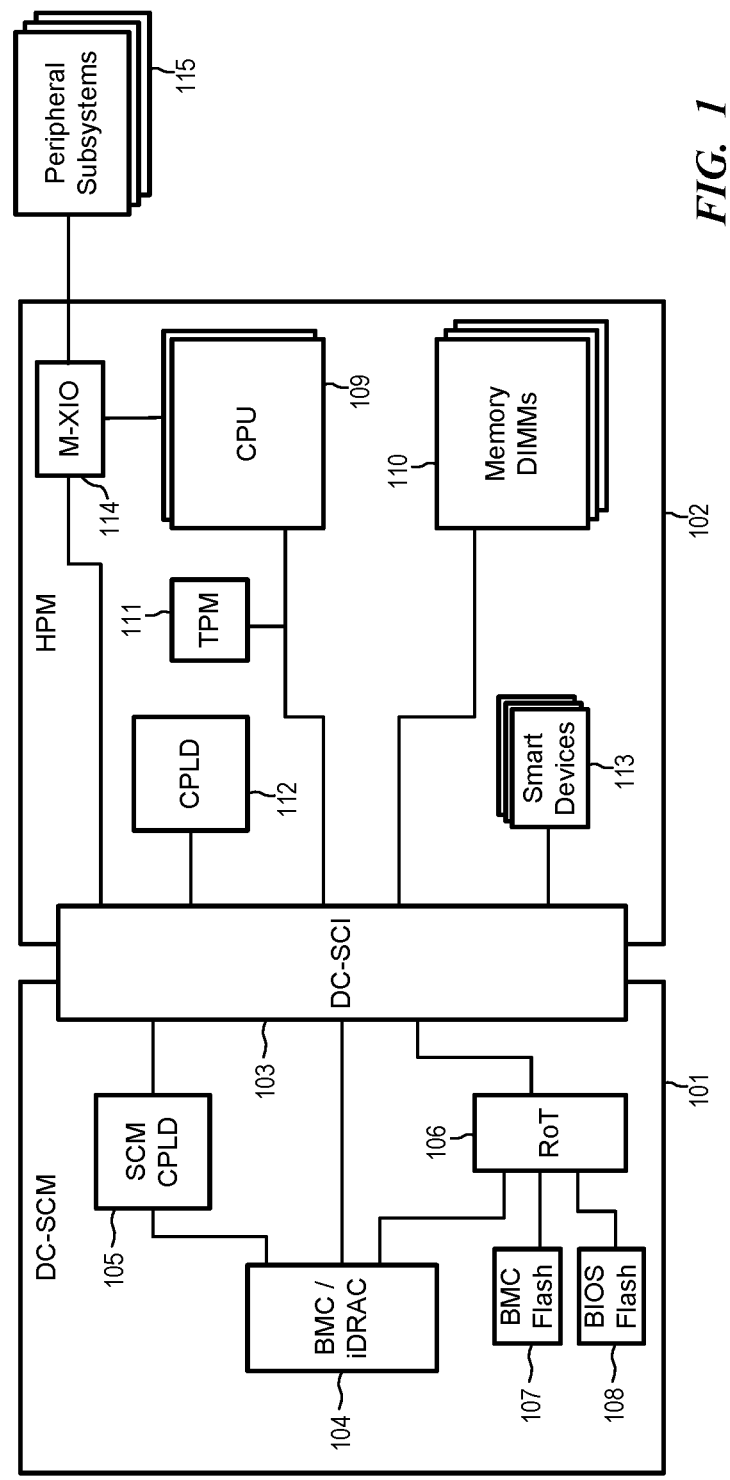
FIG. 1 is a block diagram illustrating multi-node building blocks of a Datacenter-Modular Hardware System.

FIG. 1 is a block diagram illustrating multi-node building blocks of a DC-MHS. DC-SCM 101 is coupled to HPM 102 via DC-SCI 103. The DC-SCM 101 consists of a BMC 104, which is a specialized service processor that monitors the physical state of the server. As a non-limiting example of a BMC 104, the integrated Dell Remote Access Controller (iDRAC) from DELL, INC. is embedded within DELL® PowerEdge servers and provides functionality that helps information technology (IT) administrators at a remote operations centers deploy, update, monitor, and maintain servers with no need for any additional software to be installed.

A complex programmable logic device (DC-SCM CPLD) 105 contains application specific logic and a high-speed and scalable Low-voltage differential signaling Tunneling Protocol & Interface (LTPI). A Roots of Trust (ROT) Security Processor 106 is responsible for attesting the BMC, BIOS, and/or other firmware images on the system. BMC Flash 107 consists of one or more flash devices used to contain the BMC firmware image. BIOS Flash 108 consist of one or more flash devices used to contain the BIOS firmware image for each node.

HPM 102 represents a general form factor that allows for maximum input/output (I/O) of CPUs 109 in the accessible slots. HPM 102 also includes memory or Dual In-line Memory Modules (DIMMs) 110. The HPM 102 form factor does not require a specific CPU 109 or memory 110 technology. Various HPM 102 form factors support different numbers of CPUs 109 and memory slots 110. The HPM specifications are adapted to allow multiple generations of compute core designs to fit into the form factor specification so that chassis and system designs can be reused as desired.

Trusted Platform Modules (TPM) 111 provide hardware-based, security-related functions for CPUs 109 through integrated cryptographic keys. CPLD 112 supports data exchange between DC-SCM CPLD 105 and HPM 102 using LPTI. In other configurations, HPM 102 may include other hardware components (not shown), such as memory devices, graphics processing units (GPU), peripheral I/O, etc.

HPM 102 may also include one or more smart devices 113, such as a Smart Network Interface Card (NIC), which is a programable device used to improve data center networking performance, security, features, and flexibility. Other smart devices 112 may include, for example, smart network interface cards (SmartNIC), data processing units (DPU), and infrastructure processing units (IPU).

In the DC-MHS environment an Extensible I/O (M-XIO) source connector 114 enables connectivity to peripheral subsystems 115. M-XIO 114 is a universal hardware API intended to enable the connectivity requirements of multiple different peripheral modules 115 without requiring a connector hardware. M-XIO 114 connector on HPM 102 contain a set of sideband signals that relies on circuitry to serialize/deserialize virtual wires that are tunneled over a 1-wire interface, called the Modular-Peripheral Sideband Tunneling Interface (M-PESTI). Peripheral subsystems 115 may include, for example, EDSFF (Enterprise and Datacenter Standard Form Factor) devices, RAID (Redundant Array of Independent Disks) controllers, PCIe Peripheral Component Interconnect Express (PCIe) CEM (Card Electro-Mechanical) cards, back planes, and OCP NIC 3.0 adapter cards. Other hardware interfaces and connectors to couple HPM 102 to chassis infrastructure elements and subsystems may follow the Platform Infrastructure Connectivity (M-PIC) specification.

DC-MHS provides a family of specifications to enable interoperability between datacenter and enterprise infrastructure by providing consistent interfaces and form factors among modular building blocks. For example, the Open Compute Project® is developing following HPM specifications. The Modular Hardware System Full Width Specification (M-FLW), which is an HPM form factor specification that is optimized for using the full width of a standard rack-mountable server. The Modular Hardware System Partial Width Density Optimized Specification (M-DNO), which is an HPM specification that is targeted to partial width, such as half-width or three-quarters-width, form factors.

The DC-SCM design simplifies the deployment of HPMs and increases the efficiency for time to market deployment for new systems. The DC-SCM has a standardized pinout and definition, which provides common boot, monitoring, control, and remote debug for diverse platforms.

DC-SCI 103 supports several PCIe bus options between DC-SCM 101 and HPM 102, including PCIe Gen 2.0 up to PCIe Gen 5.0 x1 interface, SPI interfaces, NC-SI RMII-based transport (RBT) interface, LTPI, eSPI bus, and I2C/I3C bus among others.

DMTF (formerly known as the Distributed Management Task Force) creates open manageability standards including the SPDM standard, which enables authentication, attestation, and key exchange to enable and enhance infrastructure security. SPDM defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

Data center administrators require components to establish trust, and to reestablish trust over time, with other components before securely communicating. SPDM provides an authentication mechanism to establish trust between two endpoints. SPDM enables the creation of a session to exchange secured messages between the endpoints. The components may include encompass a number of component types, including PCIe adapters, BMCs, authentication components, CPUs, and components that are attached over I2C/I3C or other buses. SPDM enables authentication and secure communication by retrieval of a public key certificate from a component and using a protocol to challenge the component to prove that it is the component whose identity is uniquely described by that certificate. SPDM allows retrieval of a signed measurement payload of mutable components from a component. The measurements may represent a firmware revision, component configuration, the Root of Trust for Measurements, hardware integrity, etc. SPDM provides negotiation of session keys with a component, thereby enabling secured message exchanges with that component.

The Platform Management Components Intercommunication (PMCI) working group of the DMTF prepared the Security Protocol and Data Model (SPDM) Specification (DSP0274) version 1.2.1 dated Jun. 23, 2022, defines messages, data objects, and sequences for performing message exchanges between devices over a variety of transport and physical media. The SPDM Specification sets forth a messaging protocol that defines a request-response messaging model between two endpoints to perform the message exchanges outlined in SPDM message exchanges. The content of the Security Protocol and Data Model (SPDM) Specification (DSP0274) version 1.2.1, including the SPDM message exchanges, are hereby incorporated by reference herein in its entirety.

SPDM-capable hardware devices, such as CPUs 109, memory 110, smart devices 113, and peripheral subsystems 115, that support identity authentication use a certificate chain containing an ordered list of certificates. A complete certificate chain has (i) a first certificate either signed by a Root Certificate (a certificate that specifies a trust anchor) or is a Root Certificate itself, (ii) subsequent certificates signed by the preceding certificate, and (iii) a final certificate containing a public key used to authenticate the SPDM device. The final certificate is called the leaf certificate.

Certificate chains are stored in logical locations called slots. Slots are numbered zero through seven (0-7). Each slot is either empty or contains one complete certificate chain. Slot 0 is dedicated to the device's vendor and is provisioned at manufacture. The certificate in slot 0 is protected by the device ROT against tampering. In some scenarios it may be useful to claim ownership of the device and simplify an authentication protocol by leveraging private certificate chains owned by the device user. In such cases, slots 1-7 can be used to carry non-vendor certificate chains. For example, slots 1-7 may provide a means to establish provenance of the device, such as a record of when the device was integrated into the system and configured for certain uses or purposes.

The BMC 104 retrieves the certificates via an SPDM GET_CERTIFICATE request message. The certificate chains follow either a DeviceCert model or an AliasCert model. The certificate model type is identified in certificate. The certificate chain includes a device certificate that binds an asymmetric public/private key pair to a particular device and associates the device with additional metadata. The device certificate includes hardware identity information. Embodiments disclosed herein are directed to access challenges and protection against malicious intentions for the certificate chains in slots 1-7.

A hardware device provisioned with certificate chains in slots 1-7 is not required to be protected by a device ROT against tampering. Instead, the platform in which the hardware device is being used should ensure the certificates are not maliciously modified. However, there are no restrictions on provisioning certificate types in slots 1-7 that would protect against malicious certificate imports. Therefore, without further protections beyond those required in the SPDM specification, malicious certificate can be imported into the SPDM slots and there are no restrictions on certificate types.

In one arrangement, during onboarding of a hardware device, the BMC fetches a latest manufacturer certificate profile policy and validates the device certificate profiles against the profile policy. For example, when a first device sends a set certificate command to a second device for provisioning a certificate for slots 1-7, the second device will notify a managing device, such as a BMC. The BMC validates the slot provisioning certificate for the second device against manufacturer certificate profile associated with the second device. The BMC creates policies based on manufacturer certificate types to create device trust criteria, such certificate types that are trusted and validated. The BMC caches the certificate policies and status. If the BMC successfully validates the certificate chain on the slot provisioned, then a set certificate response will be returned to first device. If the BMC fails to verify the certificate chain on the slot provisioned, then the second device is place in a quarantine state until the relevant errors are corrected.

Figure 2:
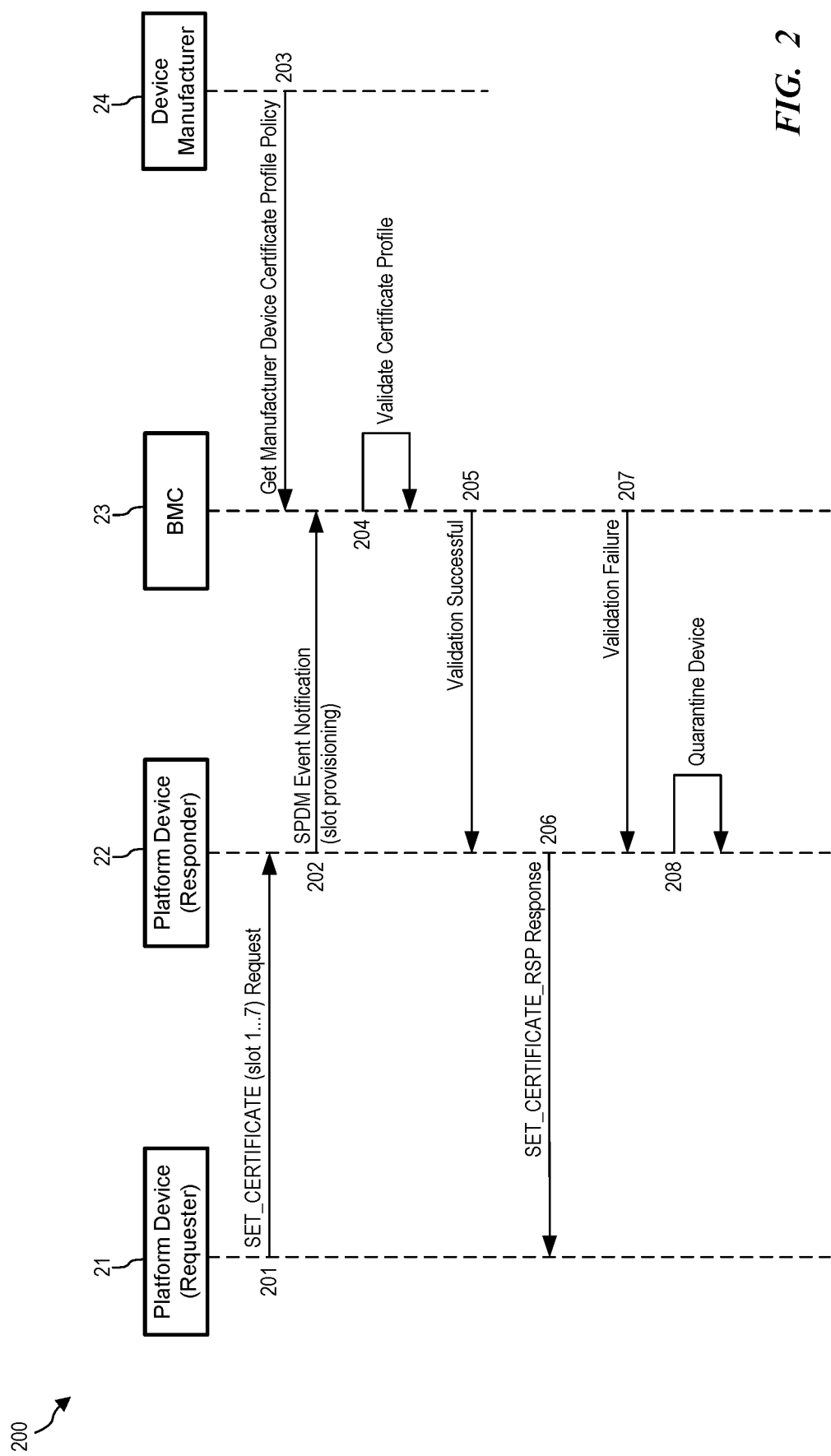
FIG. 2 illustrates a message flow that is exchanged between a first platform device, a second platform device, a BMC, and a device manufacturer system during onboarding of second platform device.

FIG. 2 illustrates a message flow 200 that is exchanged between a first platform device 21, a second platform device 22, a BMC 23, and a device manufacturer system 24 during onboarding of second platform device 22. In one embodiment, first platform device 21, second platform device 22, and BMC 23, are components of a server or IHS in a data center. The first platform device 21 and second platform device 22 may be any SPDM-capable hardware devices, such as CPUs, memory, smart devices, and peripheral subsystems. Platform device 22 has been paired with BMC 23. Platform device 22 may be at a remote physical location from BMC 23. Device manufacturer system 24 is a third-party system associated with manufacturer of platform device 22. During manufacture, the device manufacturer configures the platform device 23 to include populating slot 0. The certificate chain in slot 0 represents the manufacturer. This certificate chain is immutable and cannot be changed. This certificate chain may be referred to as the manufacturer's certificate chain.

In an example embodiment, during an onboarding process for platform device 22, the BMC 23 fetches the latest device manufacturer certificate profiles and validates the device 22 certificate profiles. Based on that validation, platform device 22 notifies another platform device 21 whether the certificate provisioning was successful or a failure. This message flow 200 may include SPDM messages where platform device 21 acts as a Requester and platform device 22 acts as a Responder.

In step 201, platform device 21 sends an SPDM SET_CERTIFICATE request message to platform device 22 for provisioning a certificate in one of slots 1-7. In response to receiving the SET_CERTIFICATE message, in step 202, platform device 22 sends an SPDM event notification message to BMC 23 to broadcast an attempt to change the state of device 22. The SPDM event notification message 202 indicates that device 21 is attempting to provision a slot in device 22 and includes the certificate to be provisioned.

In step 203, BMC 23 obtains a manufacturer device certificate profile policy from the device manufacturer system 24. BMC 23 may obtain the certificate profile policy from the device manufacturer 24 in response to the event notification message 202. Alternatively, BMC 23 may have already obtained the certificate profile policy, such as when device 22 was initially installed on the system.

In step 204, BMC 23 validates the certificate to be provisioned in a slot on device 22 against the device manufacturer's certificate profile policy. The certificate profile policy identifies one or more manufacturer-supported certificate types, such as domain validated (DV), organization validated (OV), or extended validated (EV) certificate types. BMC 23 creates policies based on the manufacturer certificate types and performs the validation in step 204 to create a device trust criteria, such as certificate type trusted and validated, unknown certificate, verification pending, etc. BMC 23 caches the certificate policies and device status locally and sends a response to device 22.

If the slot provision certificate is successfully validated against the manufacturer device certificate policy, then in step 205 BMC 23 sends a validation successful message to device 22. The certificate is then provisioned in the designated slot by device 22. In step 206, device 22 sends an SPDM SET_CERTIFICATE_RSP response message to device 21, which identifies the slot to which the new certificate has been written.

If the certificate provision status failed validation at BMC 23, then in step 207 BMC 23 sends a validation failure message to device 22. When the certificate provision fails validation, in step 208 BMC 23 will put the platform device 22 in a Quarantine state until the error is corrected.

Figure 3:
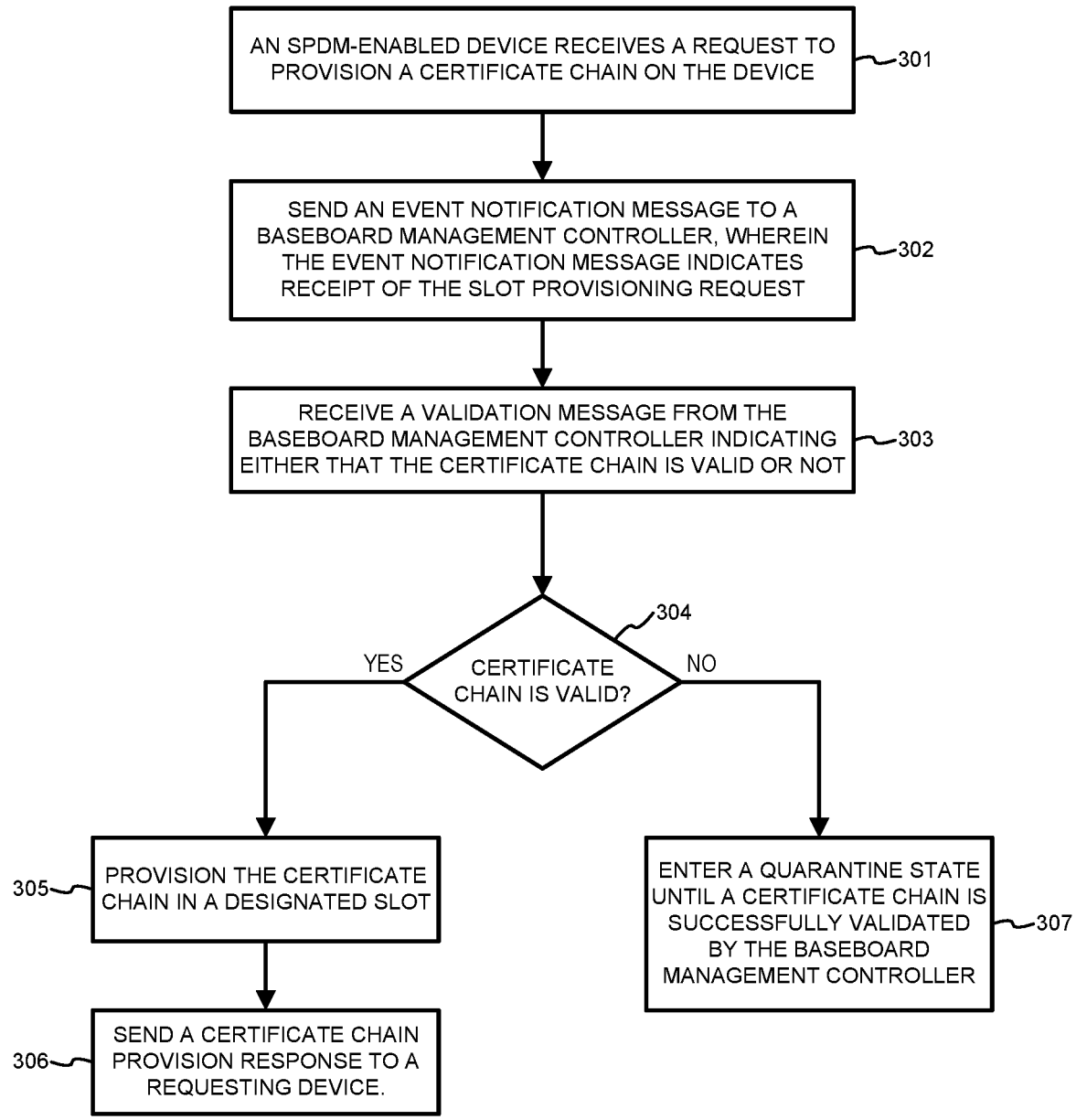
FIG. 3 is a flowchart illustrating an example process for an SPDM-enabled hardware device to process requests to provision certificates.

FIG. 3 is a flowchart illustrating an example process for an SPDM-enabled hardware device to process requests to provision certificates. In step 301, an SPDM-enabled device receives a request to provision a certificate chain on the device. The request to provision the certificate chain may be an SPDM SET_CERTIFICATE request message. In step 302, the SPDM-enabled device sends an event notification message to a baseboard management controller. The event notification message indicates receipt of the slot provisioning request. In step 303, the SPDM-enabled device receives a validation message from the baseboard management controller indicating either that the certificate chain is valid or not.

At step 304, the process branches based upon whether the certificate chain is valid or not. In step 305, if the validation message indicates a successful validation, then the SPDM-enabled device provisions the certificate chain in a designated slot. In step 306, the SPDM-enabled device sends a certificate chain provision response to a requesting device. The certificate chain provision response may be an SPDM SET_CERTIFICATE_RSP response message.

In step 307, if the validation message indicates a validation failure, then the SPDM-enabled device enters a quarantine state until a certificate chain is successfully validated by the baseboard management controller.

In one embodiment, an SPDM-enabled device conforming to an SPDM specification comprises at least one processor coupled to at least one memory. The at least one memory having program instructions stored thereon that, upon execution by the at least one processor, cause the SPDM-enabled device to receive a request to provision a certificate chain on the device, send an event notification message to a baseboard management controller, wherein the event notification message indicates receipt of a slot provisioning request, and receive a validation message from the baseboard management controller indicating either that the certificate chain is valid or not. The request to provision the certificate chain is an SPDM SET_CERTIFICATE request message.

When the validation message indicates a successful validation, then the program instructions further cause the device to provision the certificate chain in a designated slot and send a certificate chain provision response to a requesting device. The certificate chain provision response is an SPDM SET_CERTIFICATE_RSP response message.

When the validation message indicates a validation failure, then the program instructions further cause the device to enter a quarantine state until a certificate chain is successfully validated by the baseboard management controller.

In another embodiment, a BMC comprises at least one processor coupled to at least one memory. The at least one memory having program instructions stored thereon that, upon execution by the at least one processor, cause the BMC to receive an event notification message from an SPDM-enabled device, wherein the event notification message indicates receipt of a request to provision a certificate chain in a slot on the SPDM-enabled device, evaluate the certificate chain against a certificate profile policy, and notify the SPDM-enabled device whether the certificate chain is valid or not. The request to provision the certificate chain is an SPDM SET_CERTIFICATE request message.

The program instructions further cause the BMC to determine that the certificate chain is valid based on the certificate profile policy and to send a validation successful message to the SPDM-enabled device. The validation successful message causes the SPDM-enabled device to send a certificate chain provision response to a requester. The certificate chain provision response is an SPDM SET_CERTIFICATE_RSP response message.

The program instructions further cause the BMC to determine that the certificate chain is not valid based on the certificate profile policy and send a validation failure message to the SPDM-enabled device. The validation failure message causes the SPDM-enabled device to enter a quarantine state until a certificate chain is successfully validated.

The program instructions further cause the BMC to request the certificate profile policy obtained from a manufacturer of the SPDM-enabled device.

In a further embodiment, an IHS comprises a first hardware device conforming to an SPDM specification, a second hardware device conforming to the SPDM specification and configured to receive a request to provision an SPDM certificate from the first hardware device, and a BMC configured to evaluate the SPDM certificate against an SPDM certificate profile policy and to notify the second hardware device whether the SPDM certificate is valid or not. The first hardware device is configured to send an SPDM SET_CERTIFICATE request message to the second hardware device in order to request provisioning of the SPDM certificate. The second hardware device is further configured to send an event notification message to the BMC, wherein the event notification message indicates receipt of the request to provision SPDM certificate in a slot on the second hardware device. The BMC is further configured to request the certificate profile policy obtained from a manufacturer of the second hardware device.

The BMC is further configured to determine that the SPDM certificate is valid based on the certificate profile policy and to send a validation successful message to the second hardware device. The second hardware device is further configured to, in receipt of the validation successful message, send a certificate provision response to the first hardware device.

The BMC is further configured to determine that the SPDM certificate is not valid based on the certificate profile policy and to send a validation failure message to the second hardware device, and the second hardware device is configured to, upon receipt of the validation failure message, enter a quarantine state until a certificate chain is successfully validated.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A Security Protocol and Data Model (SPDM)-enabled device conforming to an SPDM specification, the device comprising at least one processor coupled to at least one memory, the at least one memory having program instructions stored thereon that, upon execution by the at least one processor, cause the SPDM-enabled device to:
receive a request from a requesting device to provision a certificate chain in a designated slot number of slots 1 to 7 on the SPDM-enabled device, wherein the request comprises the certificate chain to be provisioned and an indication of the designated slot number, and wherein the certificate chain to be provisioned includes a certificate that binds an asymmetric public/private key pair to a particular SPDM-enabled device;
send an event notification message to a baseboard management controller, wherein the event notification message indicates receipt of the request to provision the certificate chain, and wherein the event notification message comprises the certificate chain to be provisioned and an indication of the designated slot number; and
receive a validation message from the baseboard management controller indicating either that the certificate chain to be provisioned in the designated slot number is valid or not.

2. The device of claim 1, wherein the request to provision the certificate chain is an SPDM SET_CERTIFICATE request message.

3. The device of claim 1, wherein the validation message indicates a successful validation, and the program instructions further cause the device to:
provision the certificate chain in the designated slot number; and
send a certificate chain provision response to the requesting device.

4. The device of claim 3, wherein the certificate chain provision response is an SPDM SET_CERTIFICATE_RSP response message.

5. The device of claim 1, wherein the validation message indicates a validation failure, and the program instructions further cause the device to:
enter a quarantine state until a validation message is received from the baseboard management controller indicating a subsequent request to provision another certificate chain in a designated slot number of slots 1 to 7 includes a certificate chain successfully validated by the baseboard management controller.

6. A Baseboard Management Controller (BMC) comprising at least one processor coupled to at least one memory, the at least one memory having program instructions stored thereon that, upon execution by the at least one processor, cause the BMC to:
receive an event notification message from a Security Protocol and Data Model (SPDM)-enabled device, wherein the event notification message indicates receipt of a request to provision a certificate chain in a designated slot number of slots 1 to 7 on the SPDM-enabled device, wherein the event notification message comprises the certificate chain to be pro visioned and an indication of the designated slot number, and wherein the certificate chain to be provisioned includes a certificate that binds an asymmetric public/private key pair to a particular SPDM-enabled device;
determine whether the certificate chain to be provisioned on the designated slot number is valid or not, based, at least in part, on evaluating the certificate chain against a certificate profile policy; and
notify the SPDM-enabled device whether the certificate chain is valid or not.

7. The BMC of claim 6, wherein the request to provision the certificate chain is an SPDM SET_CERTIFICATE request message.

8. The BMC of claim 6 wherein the program instructions further cause the BMC to:
determine that the certificate chain is valid based on the certificate profile policy; and
send a validation successful message to the SPDM-enabled device.

9. The BMC of claim 8, wherein the validation successful message causes the SPDM-enabled device to send a certificate chain provision response to a requester.

10. The BMC of claim 9, wherein the certificate chain provision response is an SPDM SET_CERTIFICATE_RSP response message.

11. The BMC of claim 6 wherein the program instructions further cause the BMC to:
determine that the certificate chain is not valid based on the certificate profile policy; and
send a validation failure message to the SPDM-enabled device.

12. The BMC of claim 11, wherein the validation failure message causes the SPDM-enabled device to enter a quarantine state until a validation message is received by the SPDM-enabled device from the BMC indicating a subsequent request to provision another certificate chain in a designated slot number of slots 1 to 7 includes a certificate chain successfully validated by the BMC.

13. The BMC of claim 6, wherein the program instructions further cause the BMC to:
request the certificate profile policy obtained from a manufacturer of the SPDM-enabled device.

14. An Information Handling System (IHS) comprising:
a first hardware device conforming to a Security Protocol and Data Model (SPDM) specification;
a second hardware device conforming to the SPDM specification and configured to receive a request from the first hardware device to provision an SPDM certificate chain in a designated slot number of slots 1 to 7 on the second hardware device, wherein the request comprises the certificate chain to be provisioned and an indication of the designated slot number, and wherein the certificate chain to be provisioned includes a certificate that binds an asymmetric public/private key pair to a particular SPDM-enabled device; and
a Baseboard Management Controller (BMC) configured to evaluate the SPDM certificate chain against an SPDM certificate profile policy and to notify the second hardware device whether the SPDM certificate chain is valid or not.

15. The IHS of claim 14, wherein the first hardware device is configured to send an SPDM SET_CERTIFICATE request message to the second hardware device in order to request provisioning of the SPDM certificate chain.

16. The IHS of claim 14, wherein the second hardware device is further configured to send an event notification message to the BMC, wherein the event notification message indicates receipt of the request to provision the SPDM certificate chain in the designated slot on the second hardware device, and wherein the event notification message comprises the certificate chain to be provisioned and an indication of the designated slot number.

17. The IHS of claim 14, wherein the BMC is further configured to determine that the SPDM certificate chain to be provisioned in the designated slot number is valid based on the certificate profile policy and to send a validation successful message to the second hardware device.

18. The IHS of claim 17, wherein the second hardware device is further configured to, in receipt of the validation successful message, send a certificate provision response to the first hardware device.

19. The IHS of claim 14, wherein the BMC is further configured to determine that the SPDM certificate chain is not valid based on the certificate profile policy and to send a validation failure message to the second hardware device; and wherein the second hardware device is configured to, upon receipt of the validation failure message, enter a quarantine state until a validation message is received from the BMC indicating a subsequent request to provision a certificate chain in a designated slot number of slots 1 to 7 includes a certificate chain successfully validated by the BMC.

20. The IHS of claim 14, wherein the BMC is further configured to request the certificate profile policy obtained from a manufacturer of the second hardware device.

* * * * *